(12) United States Patent
Zhang et al.

(10) Patent No.: US 12,014,170 B2
(45) Date of Patent: Jun. 18, 2024

(54) MINI PROGRAM BATCH PROCESSING METHOD AND APPARATUS, ELECTRONIC DEVICE, AND READABLE STORAGE MEDIUM

(71) Applicant: Beijing Baidu Netcom Science and Technology Co., Ltd., Beijing (CN)

(72) Inventors: Hao Zhang, Beijing (CN); Yuanxu Liu, Beijing (CN); Ke Tao, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 318 days.

(21) Appl. No.: 17/397,185

(22) Filed: Aug. 9, 2021

(65) Prior Publication Data
US 2022/0012050 A1    Jan. 13, 2022

Related U.S. Application Data

(63) Continuation of application No. PCT/CN2020/122315, filed on Oct. 21, 2020.

(30) Foreign Application Priority Data

Jun. 28, 2020    (CN) .......................... 202010600458.6

(51) Int. Cl.
*G06F 8/71*    (2018.01)
*G06F 8/41*    (2018.01)
(Continued)

(52) U.S. Cl.
CPC ................ *G06F 8/71* (2013.01); *G06F 8/427* (2013.01); *G06F 8/54* (2013.01); *G06F 8/65* (2013.01)

(58) Field of Classification Search
CPC .......... G06F 8/70–75; G06F 8/54; G06F 8/61; G06F 8/65
See application file for complete search history.

(56) References Cited

U.S. PATENT DOCUMENTS

| 2004/0015831 | A1 | 1/2004 | Bowhill |
| 2013/0111433 | A1 | 5/2013 | Zhou |

(Continued)

FOREIGN PATENT DOCUMENTS

| CN | 110134843 A | 8/2019 |
| CN | 110308917 A | 10/2019 |

(Continued)

OTHER PUBLICATIONS

"Research on virtual server automatic batch deployment in IDC environment of large power company," China Academic Journal Electronic Publishing House, pp. 99-101 (Aug. 2017).

*Primary Examiner* — Duy Khuong T Nguyen
(74) *Attorney, Agent, or Firm* — Leydig, Voit & Mayer, Ltd.

(57) ABSTRACT

A mini program batch processing method and apparatus, an electronic device, and a readable storage medium are provided. A method includes: establishing a batch package submission creation event; creating, in response to the batch package submission creation event, a batch package submission task to generate a package submission work queue comprising a plurality of mini program package submission tasks; extracting a first quantity of mini program package submission tasks from the package submission work queue; creating a virtual mini program package for each of the first quantity of mini program package submission tasks; and updating the virtual mini program package to a mini program online package and automatically releasing the mini program online package.

14 Claims, 5 Drawing Sheets

(51) Int. Cl.
G06F 8/54 (2018.01)
G06F 8/65 (2018.01)

(56) References Cited

U.S. PATENT DOCUMENTS

| | | |
|---|---|---|
| 2017/0019456 A1 | 1/2017 | Balassanian |
| 2019/0102162 A1 | 4/2019 | Pitre et al. |
| 2019/0310835 A1 | 10/2019 | Gong et al. |
| 2020/0143051 A1 | 5/2020 | Zhao et al. |
| 2021/0294583 A1* | 9/2021 | Guo .......................... G06F 8/38 |
| 2021/0349700 A1* | 11/2021 | Guo .......................... G06F 8/38 |

FOREIGN PATENT DOCUMENTS

| | | |
|---|---|---|
| CN | 110569050 A | 12/2019 |
| CN | 110688124 A | 1/2020 |
| CN | 110727431 A | 1/2020 |
| CN | 110865855 A | 3/2020 |
| CN | 110968306 A | 4/2020 |
| CN | 111142884 A | 5/2020 |
| CN | 111258565 A | 6/2020 |
| CN | 111338684 A | 6/2020 |
| CN | 111752587 A | 10/2020 |
| WO | 2018113596 A1 | 6/2018 |

\* cited by examiner

MINI PROGRAM BATCH PROCESSING METHOD AND APPARATUS, ELECTRONIC DEVICE, AND READABLE STORAGE MEDIUM

CROSS REFERENCE TO RELATED APPLICATIONS

This application is a continuation of International Application No. PCT/CN2020/122315, filed on Oct. 21, 2020, which claims priority to Chinese Patent Application No. 202010600458.6, filed on Jun. 28, 2020. The entire contents of the aforementioned applications are hereby incorporated by reference in their entireties for all purposes.

TECHNICAL FIELD

The present disclosure relates to the field of man-machine interaction, and in particular to a mini program batch processing method and apparatus, an electronic device, and a readable storage medium.

BACKGROUND

With the rapid development of Internet technologies, various application programs have entered people's daily lives. As applications that can be used without downloading and installing, mini programs have received widespread attention from all walks of life. More and more application programs are loaded with mini programs to provide users with more convenient services.

For companies that do not originally have development capabilities, third-party development platforms have been launched, allowing third-party service providers to provide mini program development agent services in the form of authorization. However, in the third-party development platform, there are many mini programs to be managed, and there are frequent iterative upgrades of services, resulting in low development efficiency and failure to meet user requirements.

SUMMARY

According to an aspect of the present disclosure, there is provided a mini program batch processing method, comprising: establishing a batch package submission creation event; creating, in response to the batch package submission creation event, a batch package submission task to generate a package submission work queue comprising a plurality of mini program package submission tasks; extracting a first quantity of mini program package submission tasks from the package submission work queue; creating a virtual mini program package for each of the first quantity of mini program package submission tasks; and updating the virtual mini program package to a mini program online package and automatically releasing the mini program online package.

According to an aspect of the present disclosure, there is provided a mini program batch processing apparatus, comprising: an establishment module configured to establish a batch package submission creation event; a batch package submission task creation module configured to create, in response to the batch package submission creation event, a batch package submission task to generate a package submission work queue comprising a plurality of mini program package submission tasks; an extraction module configured to extract a first quantity of mini program package submission tasks from the package submission work queue; a virtual package creation module configured to create a virtual mini program package for each of the first quantity of mini program package submission tasks; and an update release module configured to update the virtual mini program package to a mini program online package and automatically release the mini program online package.

According to an aspect of the present disclosure, there is provided an electronic device, comprising: one or more processors and a memory storing one or more programs configured to be executed by the one or more processors, the one or more programs including instructions for causing the electronic device to perform operations comprising: establishing a batch package submission creation event; creating, in response to the batch package submission creation event, a batch package submission task to generate a package submission work queue comprising a plurality of mini program package submission tasks; extracting a first quantity of mini program package submission tasks from the package submission work queue; creating a virtual mini program package for each of the first quantity of mini program package submission tasks; and updating the virtual mini program package to a mini program online package and automatically releasing the mini program online package.

According to an aspect of the present disclosure, there is provided a non-transitory computer-readable storage medium that stores one or more programs comprising instructions that, when executed by one or more processors of an electronic device, cause the electronic device to implement operations comprising: establishing a batch package submission creation event; creating, in response to the batch package submission creation event, a batch package submission task to generate a package submission work queue comprising a plurality of mini program package submission tasks; extracting a first quantity of mini program package submission tasks from the package submission work queue; creating a virtual mini program package for each of the first quantity of mini program package submission tasks; and updating the virtual mini program package to a mini program online package and automatically releasing the mini program online package.

According to the mini program batch processing method and apparatus, the electronic device, and the readable storage medium provided in the present disclosure, mini programs can be processed in batches, improving the update and/or processing efficiency of the mini programs, and thereby enhancing user experience.

BRIEF DESCRIPTION OF THE DRAWINGS

The drawings show embodiments by way of example and form a part of the specification, and are used to explain example implementations of the embodiments together with a written description of the specification. The embodiments shown are merely for illustrative purposes and do not limit the scope of the claims. Throughout the drawings, identical reference signs denote similar but not necessarily identical elements.

DETAILED DESCRIPTION

Embodiments of the present disclosure will be described in more detail below with reference to the accompanying drawings. Although some embodiments of the present disclosure are shown in the accompanying drawings, it should be understood that the present disclosure can be implemented in various forms and should not be construed as being limited to the embodiments set forth herein. On the contrary, these embodiments are provided for a more thorough and complete understanding of the present disclosure. It should be understood that the accompanying drawings and the embodiments of the present disclosure are merely for illustrative purposes, and are not intended to limit the scope of protection of the present disclosure.

It should be understood that the steps recorded in the method implementations of the present disclosure may be performed in different orders and/or in parallel. Furthermore, additional steps may be comprised and/or the execution of the illustrated steps may be omitted in the method implementations. The scope of the present disclosure is not limited in this respect.

Related mini program platforms, such as Baidu app, WeChat, and Alipay, often provide only a code package management method for a single mini program.

When faced with a service scenario of batch operations, each mini program platform is not able to provide a management method for a batch of mini program code packages. Therefore, third-party service providers often perform encapsulation for implementation with the help of existing capabilities according to their own service characteristics.

Taking third-party service providers such as the Baidu app platform and ZOL.COM as examples, they may provide processing services such as agent development and agent launching for more than 100,000 mini programs. A large number of mini programs all need to be managed by the third-party service providers, and its service iterative upgrades are quite frequent.

With such a large number of batch processing requirements, if a third-party service provider uses a single interface serial operation, it will be time-consuming and inefficient due to a large number of submissions. If the third-party service provider submits packages in parallel, the pressure on a server will be uncontrollable, and stability will be affected. Moreover, for the same batch of mini programs, the third-party service provider needs to record and maintain information such as state transitions of mini program packages by itself, which lacks unified management.

In addition, for third-party service providers who develop and manage mini programs based on templates, package submission and launching procedures involve template code copying to generate new code packages. The batch processing of a large number of mini programs will result in the repeated generation and delivery of a large number of mini program packages, which causes slow package submission and the strain of storage, bandwidth, and CDN resources.

The third-party service provider mentioned in the present disclosure may be a mini program agent developer or a mini program developer, and the entity is not limited in the present disclosure.

A mini program batch processing method and apparatus, an electronic device, and a computer-readable storage medium provided in the embodiments of the present disclosure are described below with reference to the accompanying drawings.

Figure 1:
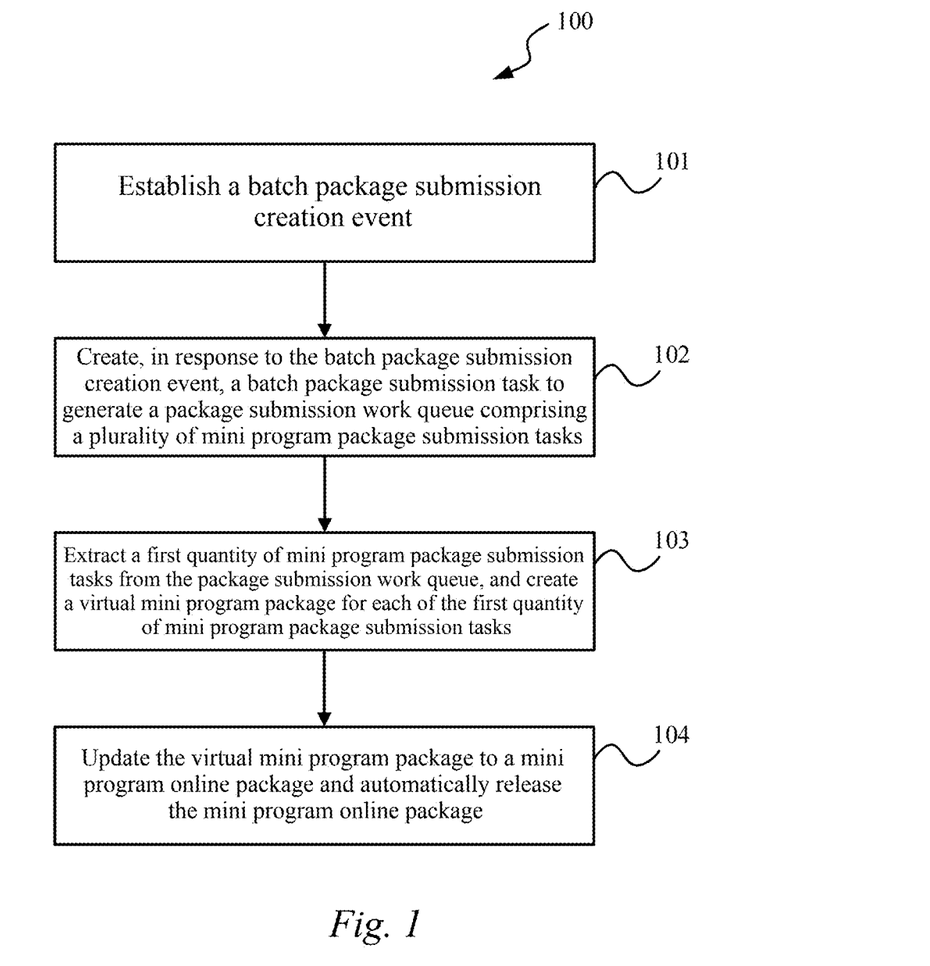
FIG. 1 is a flowchart showing a mini program batch processing method according to an embodiment of the present disclosure.

FIG. 1 is a flowchart showing a mini program batch processing method according to an embodiment of the present disclosure. It should be noted that the mini program batch processing method in the embodiments of the present disclosure can be applied to a mini program batch processing apparatus in the embodiments of the present disclosure. The batch processing apparatus may be configured on an electronic device. As an example, a mini program can be hosted on a host application, and the host application can be installed on the electronic device. The electronic device may be a mobile terminal, and the mobile terminal may be a hardware device having various operating systems, such as a mobile phone, a tablet computer, and a personal digital assistant. The mini program mentioned in the present disclosure is a cloud application program that is developed based on a specific programming language and can be used without downloading and installing. One of the features of the mini program is that it is convenient to use and does not need to be manually installed in an operating system of a terminal. Therefore, the mini program batch processing method and apparatus, the electronic device, and the readable storage medium relate to the field of computer technologies, and more specifically to the field of man-machine interaction, and can also be used in scenarios related to images, videos, speech, VR, and user understanding.

As shown in FIG. 1, a mini program batch processing method 100 is provided and comprises:

step 101: establishing a batch package submission creation event;

step 102: creating, in response to the batch package submission creation event, a batch package submission task to generate a package submission work queue comprising a plurality of mini program package submission tasks;

step 103: extracting a first quantity of mini program package submission tasks from the package submission work queue, and creating a virtual mini program package for each of the first quantity of mini program package submission tasks; and step 104: updating the virtual mini program package to a mini program online package and automatically releasing the mini program online package.

In this embodiment of the present disclosure, in step 101, the establishing a batch package submission creation event may comprises: receiving a source template, a target template, and package extension information; and establishing a batch package submission creation event for a plurality of mini programs associated with the source template.

In an example, a mini program platform receives one or more source templates, target templates, and package extension information provided by a third-party service provider. Both a source template of a mini program and a target template of the mini program may be, for example, owned by the third-party service provider and applied to the mini program developed by the third-party service provider. The package extension information contains personalized data of the mini program.

In an example, the package extension information comprises fields that a developer or the third-party service provider wants to add, such as: a number, an identifier, a platform ID, and a third-party service provider ID. The above-mentioned package extension information is used to load and render related content and is of great significance to the developer or the third-party service developer.

In this embodiment of the present disclosure, step 102 of creating, in response to the batch package submission creation event, a batch package submission task to generate a package submission work queue comprising a plurality of mini program package submission tasks comprises: parsing the plurality of mini programs associated with the source template, adding related information of each of the plurality of mini programs associated with the source template to the package submission work queue, and returning information about this batch package submission task in the form of a task tag.

In an example, in response to step 101, task information is persistently written into a task database, and specific information of this task is synchronously returned in the form of a task tag.

In an example, the mini programs associated with the source template received in step 101 are parsed, the related information of each mini program is written into the package submission work queue, and the information of this batch package submission task is returned to the developer or the third-party service developer in the form of a task tag.

The information returned to the developer or the third-party service developer is task details, and the developer or the third-party service developer has obtained the task tag. In a subsequent processing procedure, the developer or the third-party service developer can actively query the task processing progress by means of the received task tag.

In this embodiment of the present disclosure, in step 103, the first quantity is determined based on a slicing rule, wherein according to the slicing rule, the package submission work queue is sliced into N task slices, and the first N–1 task slices of the N task slices each comprise the first quantity of mini program package submission tasks.

In an example, for the package submission work queue generated in step 102, the mini programs in the work queue are extracted in slices.

In an embodiment, according to the task tag, the mini programs are extracted from the package submission work queue for the task according to a specific slicing rule, for example, 10 mini programs for one slice. Assuming that there are a total of 98 package submission tasks in the entire package submission queue, if 10 mini programs are extracted every slice, 10 task slices can be obtained, of which the first nine task slices each contain 10 package submission tasks, and the tenth task slice contains eight package submission tasks.

Extracting the package submission tasks in slices avoids the intensive scheduling of a large number of package submission tasks and effectively performs traffic peak clipping. Therefore, the mini program batch processing method in this embodiment of the present disclosure can process a large number of and a super large number of mini programs in batches.

In an example, a task status is updated to: processing. It can be understood that the developer or the third-party service provider can query the task status by means of the task tag.

In this embodiment of the present disclosure, step 103 of extracting a first quantity of mini program package submission tasks from the package submission work queue, and creating a virtual mini program package for each of the first quantity of mini program package submission tasks comprises: linking code of the virtual mini program package to code of the target template; setting the package extension information to package extension information of the target template or using default package extension information; and initializing basic information of the virtual mini program package, wherein the default package extension information is package extension information used the previous time.

In an example, new virtual mini program packages are generated for the current group of mini programs in batches, code of the virtual mini program packages is linked to the code of the target template, and the target template and the package extension information uploaded this time are combined to generate new package extension information of the virtual packages.

In an example, for the 10 mini programs in each task slice, virtual packages are respectively created for these 10 mini programs in batches: The code of the virtual packages is linked to the code of the target template, and the package extension information is previous-time package extension information by default, that is, the package extension information in the source template; or based on the package extension information submitted this time, the package extension information is set to a package extension field of the target template.

In an example, the task status is marked as: developing.

In an example, in terms of initializing the basic information of the current virtual mini program package, the basic information may comprise the name of the mini program, the logo of the mini program, entity information, etc. In an example, the entity information may include, but is not limited to, an individual, an enterprise, the media, a government agency, etc.

In this embodiment of the present disclosure, the mini program batch processing method may further comprise: after the updating the virtual mini program package to a mini program online package and automatically releasing the mini program online package, receiving request information of a host program; scanning the mini program online package according to the request information; and delivering information about the mini program online package to a client in which the host program is located.

In an example, after step 104 is performed, the virtual mini program package has been updated to the mini program online package, and the mini program online package is automatically released. At this time, the mini program online package is ready. If the mini program platform receives the request information of the host program, the current mini program online package is scanned according to the request information of the host program. In addition, the information about the mini program online package is delivered to the client in which the host program is located.

In this embodiment of the present disclosure, in the specific delivery process, the information about the mini program online package comprises: a source code address that links the target template, the package extension information, and mini program basic information. The source code address of the linked target template may point to at least one of a template, a publicly available code base fragment, or a reusable code fragment. The package extension information and the basic information of the mini program are the same as those described above, and details are not repeated herein.

In an example, the client in which the host program is located pulls out template source code nearby by means of a content delivery network (CDN), and dynamically combines the template source code, the package expansion field, and the basic information of the mini program to form a final package.

In an example, a software development kit (SDK) of the client in which the host program is located starts with the final package loaded, and the mini program autonomously obtains personalized configuration and data, and completes final rendering and presentation.

In an example, the above delivery process may also be described as follows: a user opens a mini program P1 that has been successfully released; a host program requests a mini program virtual package management center; the mini program virtual package management center queries a mini program package record table in the background, and delivers a code package address of a target template, package extension information of the mini program P1 in the package record table, and basic information of the mini program P1. Further, according to the delivered address, the host program pulls out code of the target template nearby from a content delivery network (CDN), and combines the package extension information and the basic information of the mini program P1 to form a complete package. The mini program P1 starts successfully with a SDK of a client loaded.

Based on the above mini program package delivery process, it can be learned that the mini program virtual package does not contain specific code of the target template, but contains the source code address of the linked target template, and the previous package submission and release procedures do not involve copying of the code of the target template. Therefore, even the repeated generation and delivery of a large number of mini program packages will not slow down the package submission speed. In addition, storage and download bandwidth can be saved, and the occupation of resources of the content delivery network (CDN) can be reduced.

In this embodiment of the present disclosure, the method further comprises: after the establishing a batch package submission creation event, before the creating a batch package submission task to generate a package submission work queue comprising a plurality of mini program package submission tasks, determining validity of the source template, the target template, and the package extension information to obtain a determination result; and creating, based on the determination result, the batch package submission task and updating a status of the package submission task.

In this embodiment of the present disclosure, the determining validity of the source template, the target template, and the package extension information to obtain a determination result comprises: determining development permission for the source template and the target template; and determining a status and an authorization status of the plurality of mini programs associated with the source template.

Figure 2:
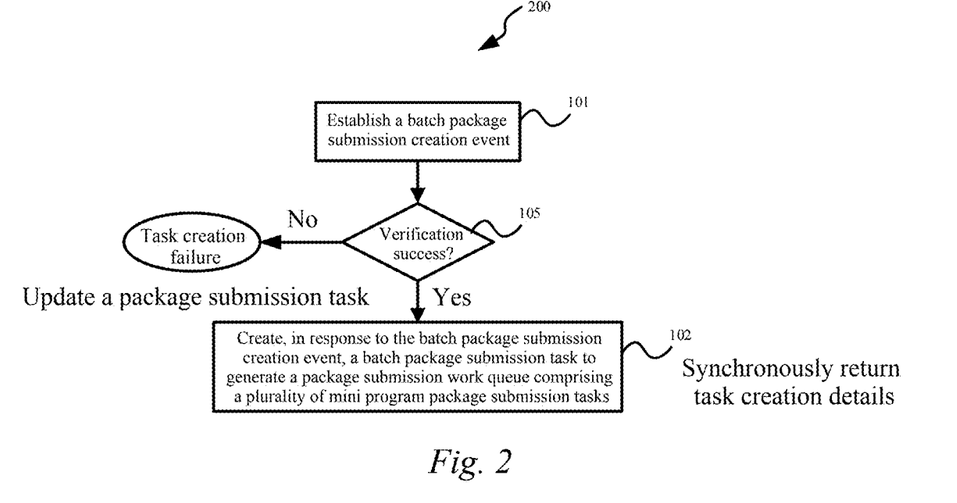
FIG. 2 is a flowchart showing some steps of a mini program batch processing method according to an embodiment of the present disclosure.

FIG. 2 is a flowchart 200 showing some steps of a mini program batch processing method according to an embodiment of the present disclosure.

As shown in FIG. 2, after step 101 of establishing a batch package submission creation event, before step 102 of creating a batch package submission task to generate a package submission work queue comprising a plurality of mini program package submission tasks, the method further comprises step 105, which is a verification step.

In an example, the mini program platform verifies permission of the developer or the third-party service provider, including but not limited to: whether the developer or the third-party service provider has development permission for both the source template and the target template, whether the source template and the target template are both in a valid state, or whether the package extension information is valid.

Figure 5:
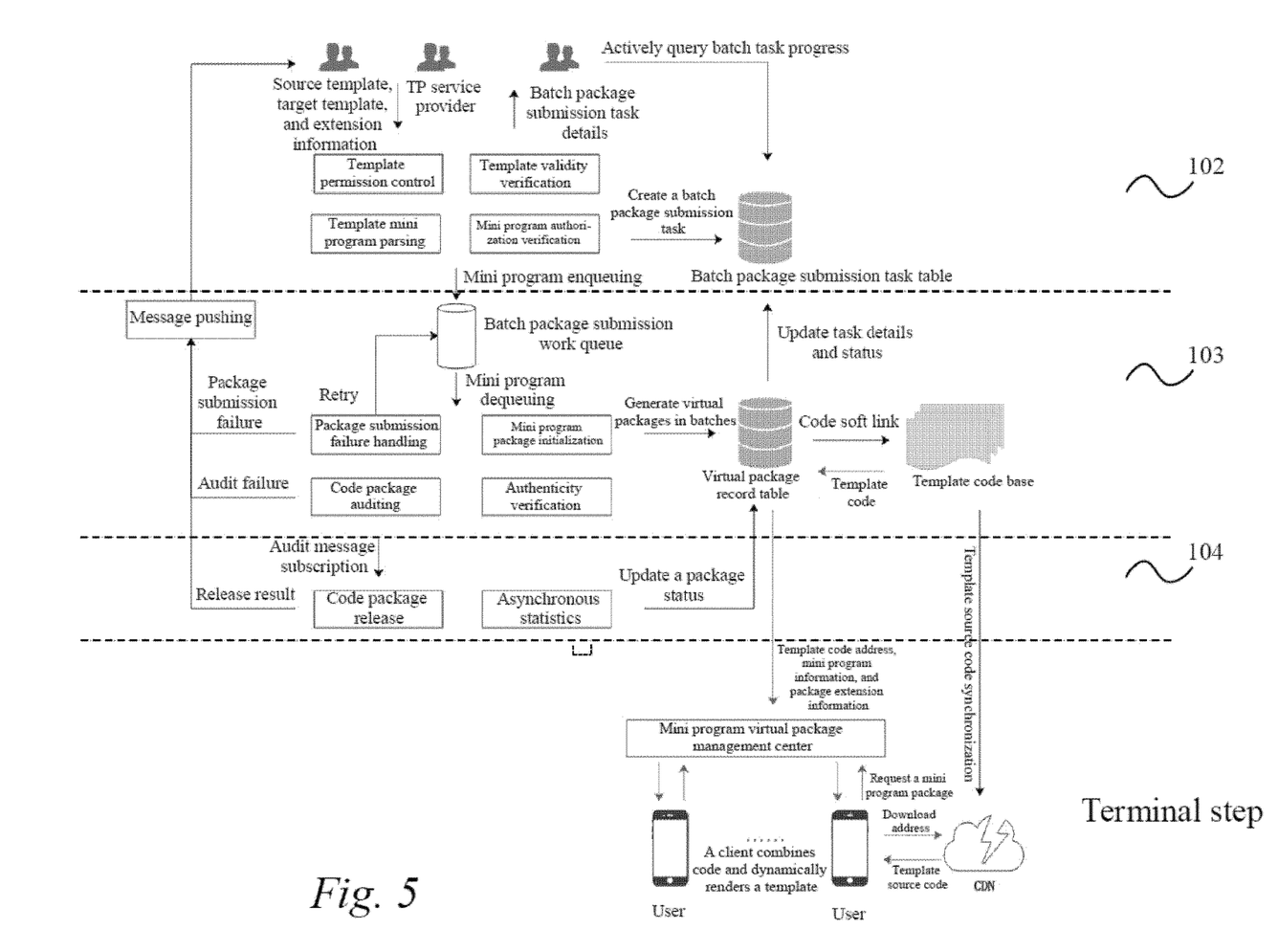
FIG. 5 is a topological diagram showing a mini program batch processing system according to an embodiment of the present disclosure.

By way of example, verification content is shown in FIG. 5. FIG. 5 is a topological diagram showing a mini program batch processing system according to an embodiment of the present disclosure.

The verification content comprises template permission control, template validity verification, and mini program authorization verification. In an example, in terms of the template permission control, the mini program platform checks whether the developer or the third-party service provider has development permission for both the source template and the target template; in terms of the template validity verification, the mini program platform checks whether the source template and the target template are valid; and in terms of the mini program authorization verification, the platform scans mini programs associated with the source template to verify validity and an authorization status of the mini programs.

In an example, still referring to FIG. 2, after the development permission and validity are both satisfied, the verification succeeds, and then step 102 will be continued in which the batch package submission task is created to generate the package submission work queue comprising the plurality of mini program package submission tasks.

If any one of the verification conditions is unsatisfied, task creation fails, and the package submission work queue will be updated. A mini program package submission task that fails to be created will no longer be put into the package submission work queue.

In this embodiment of the present disclosure, the creating a virtual mini program package for each of the first quantity of mini program package submission tasks further comprises: determining whether the virtual mini program package is successfully created the first time; if creation of the virtual mini program package failing at the first time, creating the virtual mini program package the second time; and if creation of the virtual mini program package failing at the second time, updating the package submission work queue accordingly, and pushing a creation failure message.

Figure 3:
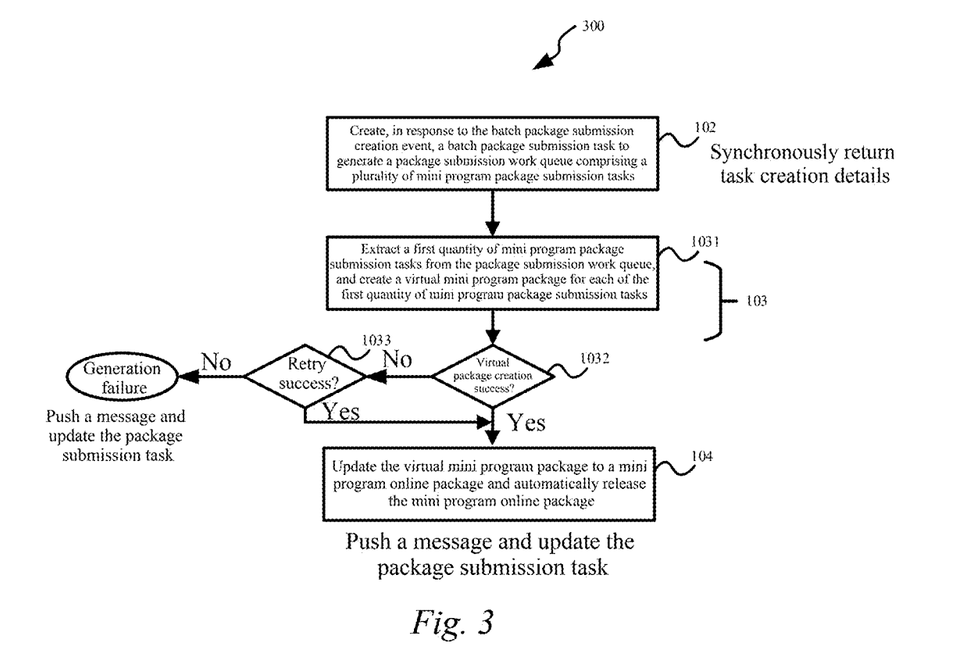
FIG. 3 is a flowchart showing some steps of a mini program batch processing method according to an embodiment of the present disclosure.

FIG. 3 is a flowchart 300 showing some steps of a mini program batch processing method according to an embodiment of the present disclosure. As shown in FIG. 3, step 103 may further comprise a determination step 1032 and a determination step 1033. The determination step 1032 is used to determine whether the virtual mini program package created in step 1031 is successfully created, that is, to determine whether the virtual mini program package is successfully created at the first time. If the virtual mini program package is successfully created at the first time, the subsequent step is continued, for example, step 104 in which the virtual mini program package is updated to a mini program online package and the mini program online package is automatically released. If creation of the virtual mini program package failing at the first time, the mini program for which the creation fails is put back into the package submission work queue, and the virtual mini program package is created at the second time (not shown). The determination step 1033 is used to determine whether the virtual mini program package is successfully created at the second time. If creation of the virtual mini program package failing at the second time, the package submission work queue is updated accordingly, and a creation failure message is pushed. For example, the creation failure message is pushed to the developer or the third-party service provider. The creation failure message pushed to the developer or the third-party service provider contains a specific cause for the virtual package creation failure.

In this embodiment of the present disclosure, the mini program batch processing method may further comprise: before the updating the virtual mini program package to a mini program online package and automatically releasing the mini program online package, receiving audit information of the virtual mini program package; auditing the audit information to obtain an audit result; and updating, based on the audit result, the virtual mini program package to a mini program online package and automatically releasing the mini program online package.

Figure 4:
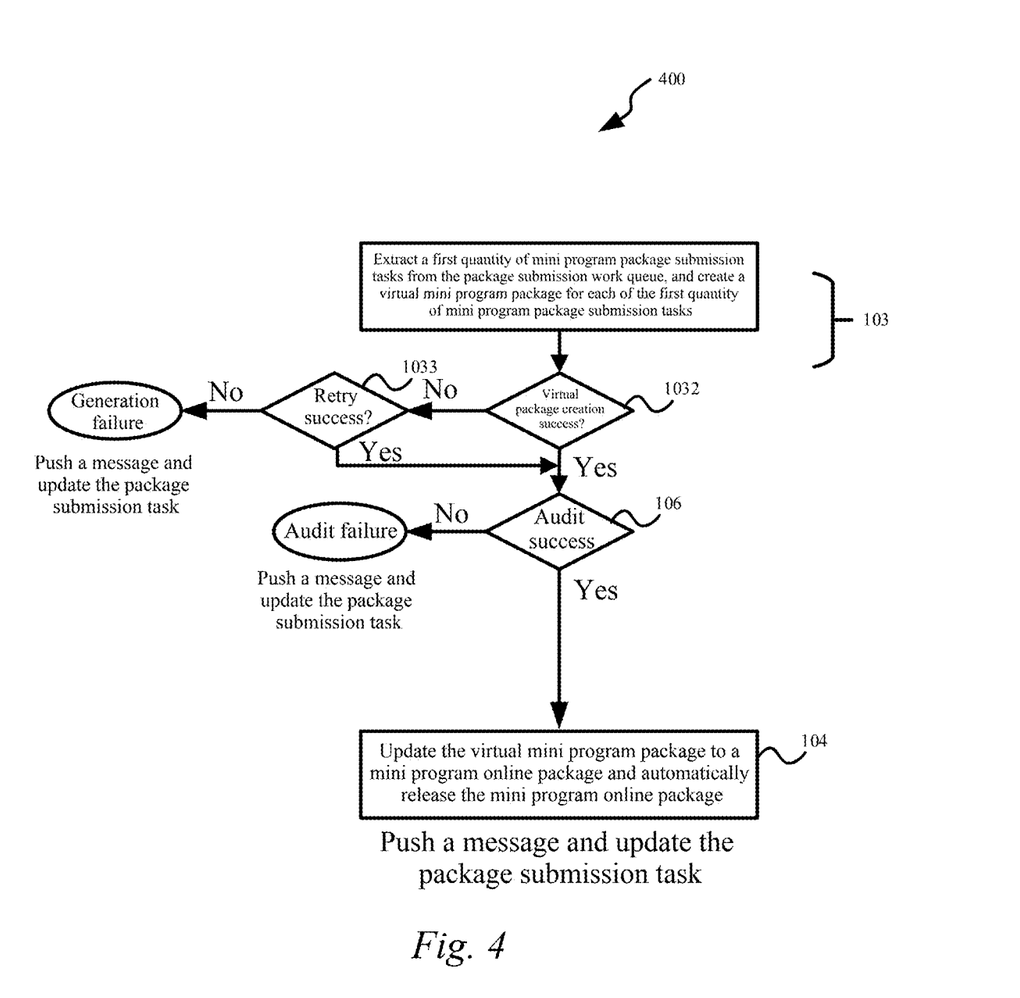
FIG. 4 is a flowchart showing some steps of a mini program batch processing method according to an embodiment of the present disclosure.

FIG. 4 is a flowchart 400 showing some steps of a mini program batch processing method according to an embodiment of the present disclosure. In an example, as shown in FIG. 4, before step 104, the method further comprises an auditing step 106 to audit the virtual package successfully created in step 103.

In an example, when the audit result is a success, step 104 is performed on the virtual mini program package successfully created in step 103.

In this embodiment of the present disclosure, as shown in FIG. 4, if the audit result is a failure, an audit failure message is pushed and the package submission work queue is updated.

In this embodiment of the present disclosure, the audit information comprises entity information of the virtual mini program package, and the auditing the audit information comprises performing a compliance audit on the entity information. For example, the basic information of the mini program, entity authorization information, the code of the target template, and the package extension information are audited.

For example, some mini program platforms do not allow individual developers to develop mini programs, and therefore when the developer is an individual, the entity information will not be verified in the auditing step 106.

For example, the auditing step may further comprise auditing business license information, the authenticity of a legal entity, etc.

In an example, the auditing may be classified into machine auditing and manual auditing. For example, for most mini programs, machine auditing is generally used. When it comes to mini programs with special entities, special content, or special industries, manual auditing is generally required. In an example, if manual auditing is used, an audit platform simulates the host program, combines the code of the target template, the package extension information, and the basic information of the mini program, and simulates the operation of the mini program, thereby completing the related auditing.

In an example, the auditing step 106 is shown as code package auditing in FIG. 5. After the auditing succeeds, step 104 is continued in which the virtual mini program package is updated to a mini program online package and the mini program online package is automatically released. If the auditing fails, the audit failure message is pushed and the package submission work queue is updated.

In this embodiment of the present disclosure, the mini program batch processing method may further comprise: after the automatically releasing the mini program online package, pushing a release success message and updating the package submission work queue.

In an example, as shown in FIG. 4, after step 104, the release success message is pushed, and the package submission work queue is updated.

In this embodiment of the present disclosure, a status of mini program batch processing is updated based on the creation failure message, the audit failure message, and the release success message.

In an example, the virtual package creation failure message generated in step 103, the audit failure message generated in step 106, and the mini program package release success message in step 104 all affect the status of the mini program batch processing, and its status is updated.

In an example, as shown in FIG. 5, there are three sources of message pushing: package submission failure handling, code package auditing, and code package release.

For the package submission failure handling, a package submission failure message is sent based on a message of a failure of a virtual package creation retrying step. For the code package auditing, the audit failure message is sent based on a message of a failure of the auditing for the generated virtual package. For the code package release, a release result message is sent based on that the virtual package is online and is released as a mini program online package.

FIG. 5 is a topological diagram showing a mini program batch processing system according to an embodiment of the present disclosure.

This embodiment of the present disclosure is described below in conjunction with FIG. 5.

In this embodiment of the present disclosure, it is assumed that a third-party service provider, a TP service provider, has developed 10 mini programs based on a template A and two mini programs based on a template B. It is found from the later operation that the effect of the template B is better, and therefore the TP service provider want to upgrade all the mini programs to the template B.

In this embodiment, step 102, step 103, step 104, and a terminal step are comprised.

Step 102 comprises the following:

The TP service provider needs to submit a source template (template A), a target template (template B), and package extension information to a mini program platform.

Next, template permission control, template validity verification, template mini program parsing, and mini program authorization verification are performed.

In an example, the mini program platform checks whether the service provider has development permission for both the template A and the template B, and whether the templates are in a valid state. Mini programs associated with the source template are scanned to verify validity and an authorization status of the mini programs and obtain 10 valid mini programs.

After the above verification step is performed, a batch package submission task is created, and a batch package submission task table is generated.

In an example, a newly created batch package submission task comprises a task tag (ID), the source template A, the target template B, the 10 mini programs to be processed, etc. The task is in a newly created state. Task details is synchronously returned to the TP service provider. The TP service provider can then actively query the task processing progress based on the task tag (ID).

In addition, the task starts asynchronously: Information of a mini program for which package submission is to be performed and that is associated with the source template is added to the package submission work queue, and an event "there is a new task to be processed" is pushed to the next procedure.

Step 103 is continued, wherein step 103 comprises:

according to the task tag (ID), mini programs are extracted from the package submission work queue for the task according to a specific slicing rule (for example, 10 mini programs for one slice). A task status is updated to: processing.

For each batch of 10 mini programs, virtual packages are created in the mini program package record table for these 10 mini programs in batches: package code is linked to code of the template B; a package extension field may be that used the previous time by default, or may be determined based on the content submitted this time and set to an extension field of the template B; the task status is marked as developing, and basic information of the current mini program package is initialized.

If there are six mini program virtual packages are successfully generated, the other four failed ones will be put back into the work queue. If the retry still fails, a quantity of failed batch package submission tasks is updated by adding 4, and specific causes for the failures of the generation of the four mini program code packages are pushed to the service provider at the same time.

For the six mini programs for which the code package generation is completed, basic information of the mini programs, entity information, and the code of the template B are pushed to an auditing platform for auditing the basic information and the authenticity of the entity.

Step 104 is continued, wherein step 104 comprises:

a message of the auditing platform is subscribed, and audit results of the six mini programs submitted for auditing are filtered with a mini program identifier (ID) and a code package identifier (ID). If two of the audit results are failures, the quantity of failed batch package submission tasks is updated by adding 2, and specific causes for the failures of the auditing of the two mini program code packages are pushed to the service provider at the same time. The code packages are automatically released for the four mini programs of which the audit results are successes.

Depending on a release result of the mini program code packages, if one fails to be released, the quantity of failed batch package submission tasks is added by 1, and a release failure message for this mini program is pushed to the service provider. For the three mini programs that have been successfully released, the task status is updated to an online state, then a quantity of successful batch package submission tasks is added by 3, and a release success message for the three mini programs is pushed to the service provider.

Based on a global asynchronous script, it is detected that release success (3)+code package generation failure (4)+audit failure (2)+release failure (1)=the total quantity (10) of mini programs contained in the task, and the task status is update to completed.

Further, a mini program delivery process is further comprised, including the terminal step: terminal dynamic and combined rendering.

When a user opens a mini program P1 that has been successfully released, the host program requests a mini program virtual package management center.

The mini program virtual package management center queries a mini program virtual package record table in the background, and delivers a code package address of the template B, package extension information of the mini program P1 in the virtual package record table, and basic information of the mini program P1.

Then according to the delivered address, the host program pulls out code of the template nearby from a content delivery network (CDN), and combines the package extension information and the basic information of the mini program P1 to form a complete mini program code package. A software development kit (SDK) of a client starts with the final package loaded, and the mini program P1 autonomously obtains personalized configuration and data, and completes final rendering and presentation.

Therefore, in this embodiment of the present disclosure, mini program package submission is performed in batches and goes online, the message notification procedure is fully asynchronous, and a result is provided in each step, which effectively clips a traffic peak for intensive scheduling. In theory, there is no limit to both duration of the package submission and a quantity of package submissions. In addition, because of the use of a mini program virtual package, a complete code package is not directly generated during the package submission and release phases. Instead, the original package information is directly delivered, and the host program pulls out a source code of the template from the CDN (content delivery network) to combine the package extension information locally and perform dynamic rendering. In the process of batch processing of mini programs, the repeated copying of code in processing procedures such as package submission and release is reduced, package storage and download bandwidth in the cloud and the CDN procedure are saved, which effectively improves the efficiency of batch package submission, release, and delivery, and greatly improves the efficiency of batch processing of the mini programs.

Figure 6:
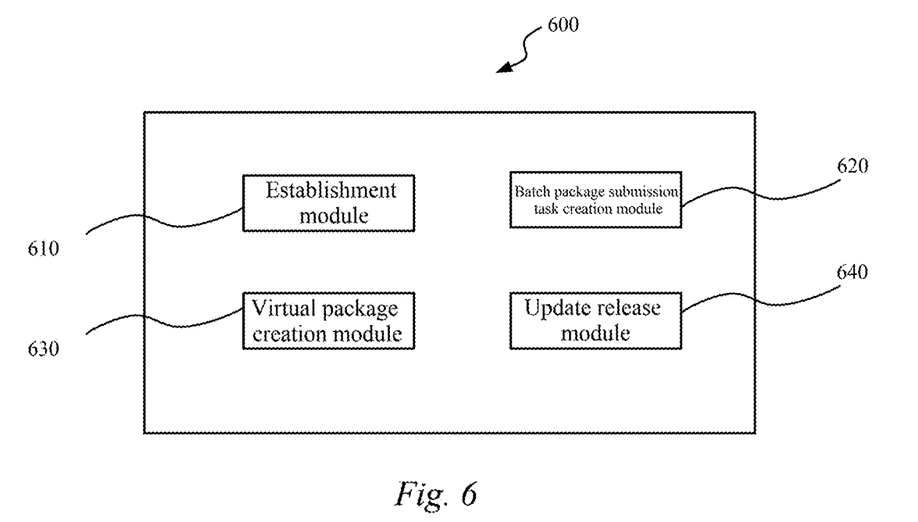
FIG. 6 is a schematic structural diagram showing a mini program batch processing apparatus according to an embodiment of the present disclosure.

Corresponding to the mini program batch processing method provided in the several embodiments described above, an embodiment of the present disclosure further provides a mini program batch processing apparatus. Because the mini program batch processing apparatus provided in this embodiment of the present disclosure corresponds to the mini program batch processing method provided in the several embodiments described above. Therefore, implementations of the mini program batch processing method described above are also applicable to the mini program batch processing apparatus provided in this embodiment, and details are not repeated in this embodiment. FIG. 6 is a schematic structural diagram of a mini program batch processing apparatus according to an embodiment of the present disclosure. As shown in FIG. 6, the mini program batch processing apparatus 600 may comprise: an establishment module 610, a batch package submission task creation module 620, a virtual package creation module 630, and an update release module 640. In an example, the apparatus comprises:

the establishment module 610 configured to establish a batch package submission creation event;

the batch package submission task creation module 620 configured to create, in response to the batch package submission creation event, a batch package submission task to generate a package submission work queue comprising a plurality of mini program package submission tasks;

the virtual package creation module 630 configured to extract a first quantity of mini program package submission tasks from the package submission work queue, and create a virtual mini program package for each of the first quantity of mini program package submission tasks; and the update release module 640 configured to update the virtual mini program package to a mini program online package and automatically release the mini program online package.

According to an embodiment of the present disclosure, the present disclosure further provides an electronic device, and the electronic device comprises: a processor; and a memory that stores a program, the program comprising instructions that, when executed by the processor, cause the processor to perform the foregoing mini program batch processing method.

According to an embodiment of the present disclosure, a computer-readable storage medium that stores a program is further provided, the program comprising instructions that, when executed by a processor of an electronic device, cause the electronic device to perform the foregoing mini program batch processing method.

Figure 7:
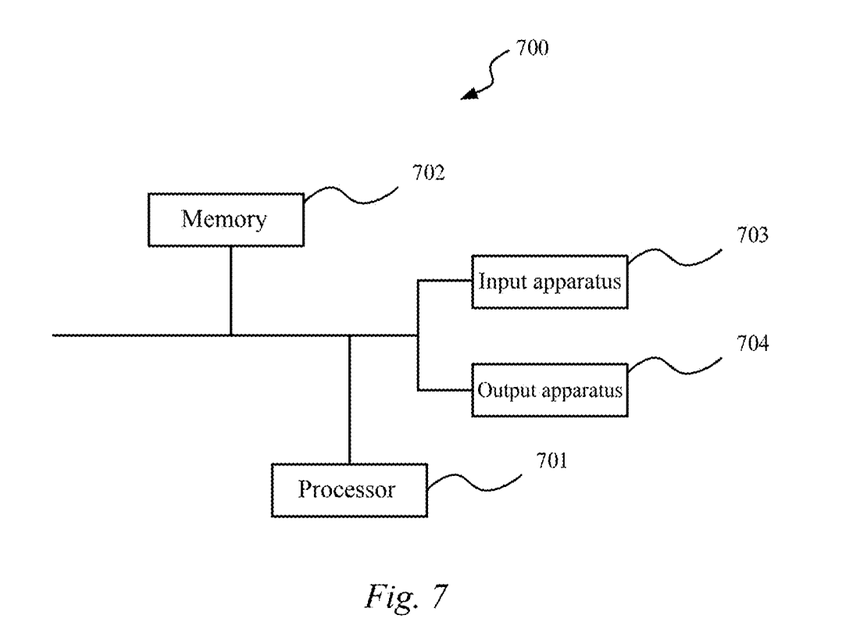
FIG. 7 is a structural block diagram showing an example computing device that can be applied to an embodiment of the present disclosure.

FIG. 7 is a block diagram of an electronic device for implementing a mini program batch processing method according to an embodiment of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile apparatuses, such as a personal digital assistant, a cellular phone, a smartphone, a wearable device, and other similar computing apparatuses. The components shown herein, their connections and relationships, and their functions are merely examples, and are not intended to limit the implementation of the present disclosure described and/or required herein.

As shown in FIG. 7, the electronic device 700 comprises: one or more processors 701, a memory 702, and interfaces for connecting various components, comprising a high-speed interface and a low-speed interface. The various components are connected to each other by using different buses, and may be mounted on a common motherboard or in other manners as required. The processor may process instructions executed in the electronic device, comprising instructions stored in or on the memory to display graphical information of a GUI on an external input/output apparatus (such as a display device coupled to an interface). In other implementations, if required, the plurality of processors and/or a plurality of buses can be used together with a plurality of memories. Similarly, a plurality of electronic devices can be connected, and each device provides some of the necessary operations (for example, as a server array, a group of blade servers, or a multi-processor system). In FIG. 7, there being one processor 701 is taken as an example.

The memory 702 is a non-transitory computer-readable storage medium provided in the present disclosure. The memory stores instructions that can be executed by at least one processor, so that the at least one processor performs the mini program batch processing method provided in the present disclosure. The non-transitory computer-readable storage medium of the present disclosure stores computer instructions for causing a computer to perform the mini program batch processing method provided in the present disclosure.

As a non-transitory computer-readable storage medium, the memory 702 can be configured to store non-transitory software programs, non-transitory computer-executable programs and modules, such as program instructions/modules corresponding to the mini program batch processing method in the embodiments of the present disclosure (for example, the establishment module 610, the batch package submission task creation module 620, the virtual package creation module 630, and the update release module 640 shown in FIG. 6). The processor 701 executes various functional applications and data processing of the server, that is, implements the mini program batch processing method in the above method embodiment, by running the non-transitory software programs, instructions, and modules stored in the memory 702.

The memory 702 may comprise a program storage area and a data storage area, wherein the program storage area may store an operating system and an application program required by at least one function; and the data storage area can store data created according to the use of the electronic device for implementing the mini program batch processing method. Moreover, the memory 702 may comprise a high-speed random access memory, and may further comprise a non-transitory memory, such as at least one magnetic disk storage device, a flash memory device, or other non-transitory solid-state storage devices. In some embodiments, the memory 702 may optionally comprise memories disposed remotely relative to the processor 701, and these remote memories may be connected, through a network, to the electronic device for implementing the mini program batch processing method. Instances of the above network include, but are not limited to, the Internet, an enterprise intranet, a local area network, a mobile communications network, and a combination thereof.

The electronic device 700 for implementing the mini program batch processing method may further comprise: an input apparatus 703 and an output apparatus 704. The processor 701, the memory 702, the input apparatus 703, and the output apparatus 704 may be connected through a bus or in other manners. In FIG. 7, the connection using a bus is taken as an example.

The input apparatus 703 can receive entered digit or character information, and generate a key signal input related to user settings and function control of the electronic device for implementing the mini program batch processing method, and may be input apparatuses such as a touchscreen, a keypad, a mouse, a trackpad, a touchpad, an indicator rod, one or more mouse buttons, a trackball, and a joystick. The output apparatus 704 may comprise a display device, an auxiliary lighting apparatus (such as an LED), a tactile feedback apparatus (such as a vibration motor), etc. The display device may include, but is not limited to, a liquid crystal display (LCD), a light-emitting diode (LED) display, and a plasma display. In some implementations, the display device may be a touchscreen.

Various implementations of the systems and technologies described herein can be implemented in a digital electronic circuit system, an integrated circuit system, an ASIC (application-specific integrated circuit), computer hardware, firmware, software, and/or a combination thereof. These various implementations may comprise: the systems and technologies are implemented in one or more computer programs, wherein the one or more computer programs may be executed and/or interpreted on a programmable system comprising at least one programmable processor. The programmable processor may be a dedicated or general-purpose programmable processor that can receive data and instructions from a storage system, at least one input apparatus, and at least one output apparatus, and transmit data and instructions to the storage system, the at least one input apparatus, and the at least one output apparatus.

These computing programs (also referred to as programs, software, software applications, or code) comprise machine instructions of a programmable processor, and can be implemented by using an advanced procedure and/or object-oriented programming languages, and/or assembly/machine languages. As used herein, the terms "machine-readable medium" and "computer-readable medium" refer to any computer program product, device, and/or apparatus (for example, a magnetic disk, an optical disc, a memory, a programmable logic device (PLD)) configured to provide machine instructions and/or data to a programmable processor, comprising a machine-readable medium that receives machine instructions as machine-readable signals. The term "machine-readable signal" refers to any signal used to provide machine instructions and/or data to a programmable processor.

In order to provide interaction with a user, the systems and technologies described herein can be implemented on a computer which has: a display apparatus (for example, a CRT (cathode-ray tube) or an LCD (liquid crystal display) monitor) configured to display information to the user; and a keyboard and pointing apparatus (for example, a mouse or a trackball) through which the user can provide an input to the computer. Other types of apparatuses can also be used to provide interaction with the user; for example, feedback provided to the user can be any form of sensory feedback (for example, visual feedback, auditory feedback, or tactile feedback), and an input from the user can be received in any form (including an acoustic input, voice input, or tactile input).

The systems and technologies described herein can be implemented in a computing system (for example, as a data server) comprising a backend component, or a computing system (for example, an application server) comprising a middleware component, or a computing system (for example, a user computer with a graphical user interface or a web browser through which the user can interact with the implementation of the systems and technologies described herein) comprising a frontend component, or a computing system comprising any combination of the backend component, the middleware component, or the frontend component. The components of the system can be connected to each other through digital data communication (for example, a communications network) in any form or medium. Examples of the communications network comprise: a local area network (LAN), a wide area network (WAN), and the Internet.

A computer system may comprise a client and a server. The client and the server are generally far away from each other and usually interact through a communications network. A relationship between the client and the server is generated by computer programs running on respective computers and having a client-server relationship with each other.

It should be understood that steps may be reordered, added, or deleted based on the various forms of procedures shown above. For example, the steps recorded in the present application can be performed in parallel, in order, or in a different order, provided that the desired result of the technical solutions disclosed in the present disclosure can be achieved, which is not limited herein.

The specific implementations above do not constitute a limitation on the protection scope of the present disclosure. Those skilled in the art should understand that various modifications, combinations, sub-combinations, and replacements can be made according to design requirements and other factors. Any modifications, equivalent replacements, improvements, etc. within the spirit and principle of the present disclosure shall fall within the protection scope of the present disclosure.

The invention claimed is:

1. A batch processing method, comprising:
  establishing, by a processor, a batch package submission creation event, wherein establishing the batch package submission creation event comprises:
    receiving a source template, a target template, and package extension information, wherein the source template is a template used to develop a mini program before batch processing, and the target template is a template used to develop the mini program during the batch processing; and
    establishing the batch package submission creation event for a plurality of mini programs associated with the source template;
  creating, by the processor, in response to the batch package submission creation event, a batch package submission task to generate a package submission work queue comprising a plurality of mini program package submission tasks;
  extracting, by the processor, a first quantity of mini program package submission tasks from the package submission work queue;
  creating, by the processor, a virtual mini program package for each of the first quantity of mini program package submission tasks, wherein the virtual mini program package is to be updated to a mini program online package, the mini program online package is for accessing by a host program residing on a client to launch the mini program on the client, the virtual mini program package comprises a source code address linked to source code of the target template, and the creating the virtual mini program package comprises:
    linking the source code address of the virtual mini program package to the source code of the target template so as to enable access by the host program to the source code of the target template via the source code address of the virtual mini program package;
    setting the package extension information to package extension information of the target template or using default package extension information, wherein the default package extension information is the package extension information used by the mini program before the batch processing; and
    initializing basic information of the virtual mini program package, wherein the basic information comprises a name of the mini program, a logo of the mini program, and entity information of the mini program; and
  updating, by updating a task status of the mini program by the processor, the virtual mini program package to the mini program online package and automatically releasing the mini program online package.

2. The method of claim 1, wherein the creating the batch package submission task comprises:
  parsing the plurality of mini programs associated with the source template;
  adding related information of each mini program of the plurality of mini programs associated with the source template to the package submission work queue; and
  returning information about the batch package submission task as a task tag.

3. The method of claim 1, further comprising:
  determining the first quantity of mini program package submission tasks based on applying a slicing rule,
  wherein applying the slicing rule comprises slicing the package submission work queue into N task slices, wherein first N−1 ones of the N task slices each comprise the first quantity of mini program package submission tasks.

4. The method of claim 1, further comprising, after the establishing the batch package submission creation event and before the creating the batch package submission task:
determining validity of the source template, the target template, and the package extension information to obtain a determination result; and
creating, based on the determination result, the batch package submission task and updating a status of the package submission task.

5. The method of claim 4, wherein the determining the validity of the source template, the target template, and the package extension information to obtain the determination result comprises:
determining development permission for the source template and the target template; and
determining a status and an authorization status of the plurality of mini programs associated with the source template.

6. The method of claim 1, wherein the creating the virtual mini program package for each of the first quantity of mini program package submission tasks further comprises:
determining whether the virtual mini program package is successfully created at a first time;
in response to creation of the virtual mini program package failing at the first time, creating the virtual mini program package at a second time; and
in response to creation of the virtual mini program package failing at the second time, updating the package submission work queue accordingly, and pushing a creation failure message.

7. The method of claim 6, further comprising, before the updating the virtual mini program package to the mini program online package and automatically releasing the mini program online package:
receiving audit information of the virtual mini program package; and
auditing the audit information to obtain an audit result, wherein the updating the virtual mini program package to a mini program online package and automatically releasing the mini program online package comprises updating, based on the audit result, the virtual mini program package to the mini program online package and automatically releasing the mini program online package.

8. The method of claim 7, further comprising:
in response to the audit result being a failure, pushing an audit failure message and updating the package submission work queue.

9. The method of claim 8, further comprising:
after the automatically releasing the mini program online package, pushing a release success message and updating the package submission work queue.

10. The method of claim 9, further comprising:
updating a status of mini program batch processing based on the creation failure message, the audit failure message, and the release success message.

11. The method of claim 7, wherein
the audit information comprises entity information of the virtual mini program package, and
the auditing the audit information comprises performing a compliance audit on the entity information.

12. An electronic device, comprising:
one or more processors; and
a memory storing one or more programs configured to be executed by the one or more processors, the one or more programs including instructions for causing the electronic device to perform operations comprising:
establishing a batch package submission creation event, wherein establishing the batch package submission creation event comprises:
receiving a source template, a target template, and package extension information, wherein the source template is a template used to develop a mini program before batch processing, and the target template is a template used to develop the mini program during the batch processing; and
establishing the batch package submission creation event for a plurality of mini programs associated with the source template;
creating, in response to the batch package submission creation event, a batch package submission task to generate a package submission work queue comprising a plurality of mini program package submission tasks;
extracting a first quantity of mini program package submission tasks from the package submission work queue;
creating a virtual mini program package for each of the first quantity of mini program package submission tasks, wherein the virtual mini program package is to be updated to a mini program online package, the mini program online package is for accessing by a host program residing on a client to launch the mini program on the client, the virtual mini program package comprises a source code address linked to source code of the target template, and the creating the virtual mini program package comprises:
linking the source code address of the virtual mini program package to the source code of the target template so as to enable access by the host program to the source code of the target template via the source code address of the virtual mini program package;
setting the package extension information to package extension information of the target template or using default package extension information, wherein the default package extension information is the package extension information used by the mini program before the batch processing; and
initializing basic information of the virtual mini program package, wherein the basic information comprises a name of the mini program, a logo of the mini program, and entity information of the mini program; and
updating, by updating a task status of the mini program, the virtual mini program package to the mini program online package and automatically releasing the mini program online package.

13. The electronic device of claim 12, wherein the creating the batch package submission task comprises:
parsing the plurality of mini programs associated with the source template;
adding related information of each mini program of the plurality of mini programs associated with the source template to the package submission work queue; and
returning information about the batch package submission task as a task tag.

14. A non-transitory computer-readable storage medium that stores one or more programs comprising instructions that, when executed by one or more processors of an electronic device, cause the electronic device to implement operations comprising:

establishing a batch package submission creation event, wherein establishing the batch package submission creation event comprises:

receiving a source template, a target template, and package extension information, wherein the source template is a template used to develop a mini program before batch processing, and the target template is a template used to develop the mini program during the batch processing; and         establishing the batch package submission creation event for a plurality of mini programs associated with the source template;

creating, in response to the batch package submission creation event, a batch package submission task to generate a package submission work queue comprising a plurality of mini program package submission tasks;

extracting a first quantity of mini program package submission tasks from the package submission work queue;

creating a virtual mini program package for each of the first quantity of mini program package submission tasks, wherein the virtual mini program package is to be updated to a mini program online package, the mini program online package is for accessing by a host program residing on a client to launch the mini program on the client, the virtual mini program package comprises a source code address linked to source code of the target template, and the creating the virtual mini program package comprises:

linking the source code address of the virtual mini program package to the source code of the target template so as to enable access by the host program to the source code of the target template via the source code address of the virtual mini program package;

setting the package extension information to package extension information of the target template or using default package extension information, wherein the default package extension information is the package extension information used by the mini program before the batch processing; and         initializing basic information of the virtual mini program package, wherein the basic information comprises a name of the mini program, a logo of the mini program, and entity information of the mini program; and     updating, by updating a task status of the mini program, the virtual mini program package to the mini program online package and automatically releasing the mini program online package.

\* \* \* \* \*